March 27, 1956  M. P. WINTHER  2,739,487
MULTIPLE SPEED TRANSMISSION
Filed Feb. 19, 1952  2 Sheets-Sheet 1

INVENTOR.
MARTIN P. WINTHER
BY
McDonald & Tiagro
ATTORNEYS

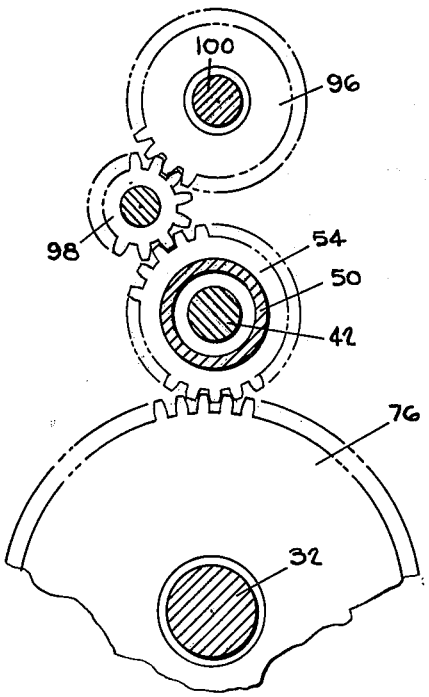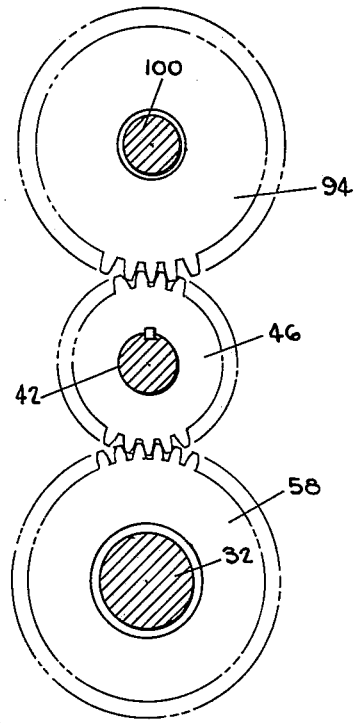

United States Patent Office 2,739,487
Patented Mar. 27, 1956

2,739,487

MULTIPLE SPEED TRANSMISSION

Martin P. Winther, Gates Mills, Ohio, assignor, by mesne assignments, to Eaton Manufacturing Company, Cleveland, Ohio, a corporation of Ohio Application February 19, 1952, Serial No. 272,375

11 Claims. (Cl. 74—330)

This invention relates to transmissions and more particularly to multiple forward and reverse speed transmissions for vehicles and the like.

Broadly the invention comprehends the provision of a transmission embodying a multiple speed forward ladder gear type transmitting arrangement and a like speed reverse gear transmitting arrangement, said transmission incorporating basically a pair of alternately operable power input clutches, a multiple of gear trains driven thereby including a reverse gear cluster incorporating as elements thereof a friction clutch and a reverse gear idler, and a multiple of friction clutches for controlling the multiple gear trains.

Among the principal objects of the invention are the provision of a multiple forward and reverse speed transmission that;

1. Can change gears under full power with the exception of one gear speed change;

2. Provides an equivalent number of reverse speeds as forward speeds;

3. Provides for the rocking of a vehicle in which incorporated is the full range of forward and reverse speeds;

4. Provides for the rocking of the vehicle in which employed at either the same speeds backward or forward or at a faster reverse than is had for forward;

5. Provides through the utilization of an auxiliary gear box for an increased number of forward and reverse speeds;

6. Provides through the utilization of a pair of eddy current electromagnetic clutches with gearing interconnected therebetween for a braking of the transmission in both forward and reverse gearing upon the simultaneous energization of the clutches; and 7. Is adaptable to vehicles of the bulldozer or off the road heavy duty type.

Other objects and advantages of the invention will appear from the following description taken in connection with the drawings forming a part of the specification, and in which:

Fig. 2 is a fragmentary cross-sectional view taken substantially along lines 2—2 of Fig. 1; and Fig. 3 is a fragmentary cross-sectional view taken substantially along lines 3—3 of Fig. 1.

Similar reference characters indicate corresponding parts throughout the several views of the drawings.

Figure 1:
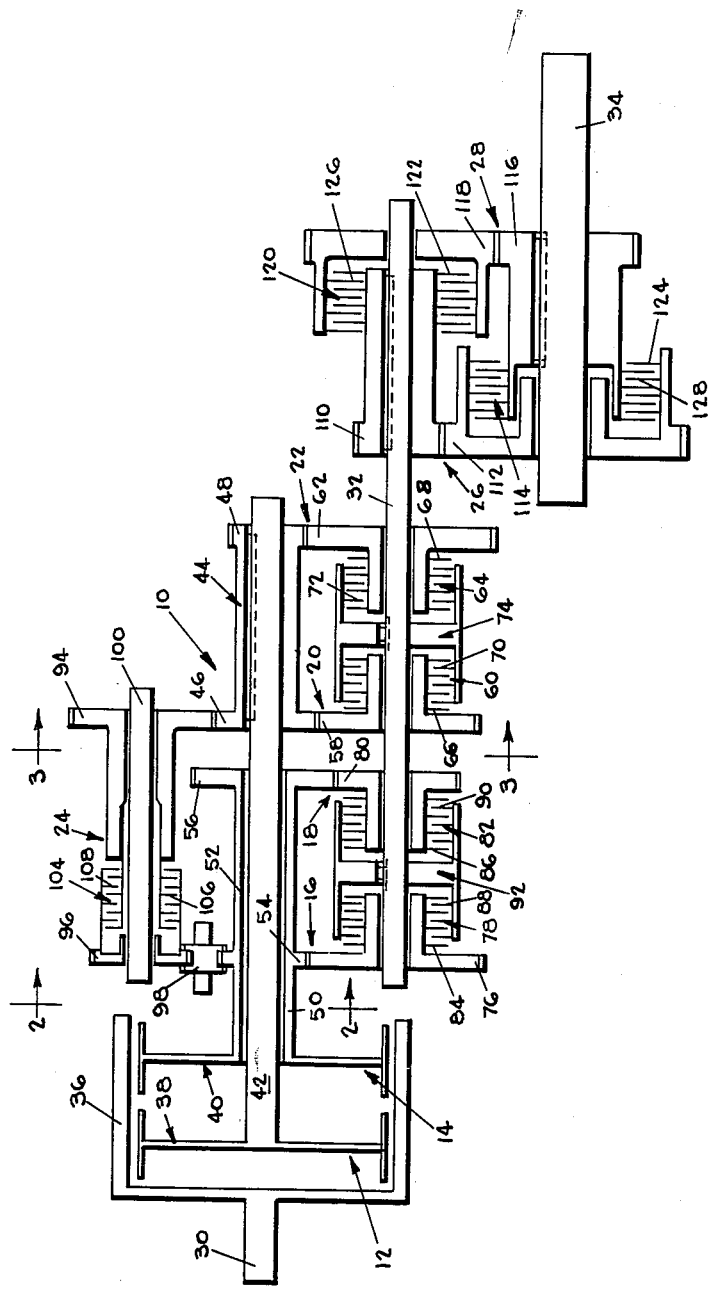
Fig. 1 is a schematic illustration of a multiple forward and reverse speed transmission.

This transmission was devised primarily for use in off the road vehicles such as bulldozers and the like wherein it is desired to have a multiple of reverse as well as forward speeds.

By so utilizing a pair of main power input preferably eddy current electromagnetic clutches in arrangement with a ladder type gearing including two sets of gears associated with each clutch and an auxiliary two speed gear box it is possible to obtain eight forward speeds. Further by the addition of a reverse gear cluster, and an idler gear in meshing relation to the output of the clutches it is possible to obtain eight reverse speeds. The operation of the gear sets associated with the clutches, the reverse gear cluster, and the auxiliary gear box are controlled by friction clutches adapted to be operated in predetermined relation with the main clutches so as to effect the desired direction and speed of operation of the transmission. By alternating between the main clutches a rocking of the vehicle in which the transmission is incorporated can be achieved whereby rocking is obtainable for the full range of forward and reverse speeds of operation of the transmission.

Gear changes can be made at full power except for between fourth and fifth speeds, that is the period required to change from one range to another in the auxiliary gear box.

Because of the arrangement of the clutches with the gear sets interconnected between the output elements of the main clutches and since the input elements of the main clutches are driven simultaneously from the same source of power it is possible upon the energization of both main clutches simultaneously to effect a braking of the transmission.

Referring to the drawings for more specific details of the invention 10 represents generally a multiple forward and reverse speed transmission comprising basically a pair of main power input clutches 12 and 14, gear sets 16, 18, 20 and 22, reverse gear cluster 24, auxiliary gear sets 26 and 28, and input, intermediate and output shafts 30, 32 and 34 respectively.

Input shaft 30 has affixed thereto a drum member 36 constituting an input or driving member of both clutches 12 and 14.

Clutches 12 and 14 are preferably of the eddy current electromagnetic type and comprise in addition to the input member 36, rotor or output members 38 and 40 respectively. Output member 38 includes an output shaft 42 having a gear cluster 44 fixedly secured thereon, comprising axially spaced gears 46 and 48 whereas output member 40 includes a quill shaft 50, encircling shaft 42, having a gear cluster 52 thereon, comprising axially spaced gears 54 and 56.

Gear 46 constituting a part of gear set 20 meshes with a gear 58, forming the other part thereof, and gear 58 is in turn adapted to be coupled to intermediate shaft 32 by way of a friction clutch 60. Gear 48, of gear cluster 44, constituting a part of gear set 22 meshes with a gear 62, forming the other part thereof, and gear 62 is in turn adapted to be coupled to intermediate shaft 32 by way of a friction clutch 64. Both clutches 60 and 64 as shown are of the multiple plate type and include respectively input plates 66 and 68 connected to the respective gears 58 and 62, and output plates 70 and 72 respectively connected to a common support 74 having keyed relation with intermediate shaft 32.

Gear 54 constituting a part of gear set 16, meshes with a gear 76, forming the other part thereof, and gear 76 is in turn adapted to be coupled to intermediate shaft 32 by way of a friction clutch 78. Gear 56, of gear cluster 52, constituting a part of gear set 18, meshes with a gear 80, forming the other part thereof, and gear 80 is in turn adapted to be coupled to intermediate shaft 32 by way of a friction clutch 82. Both clutches 78 and 82 are identical to clutches 60 and 62 and include input plates 84 and 86 connected to the respective gears 76 and 80, and output plates 88 and 90 respectively connected to a common support 92 having keyed relation with intermediate shaft 32.

Reverse gear cluster 24 includes a gear 94 having meshing relation with gear 46 and a gear 96 having meshing relation with a reverse idler gear 98, said idler gear in turn meshing with gear 54 of gear cluster 52. Gears 94 and 96 are supported for rotation on jack shaft 100 and are adapted to be coupled together by a friction clutch 104. The clutch 104 includes engageable plates 106 and 108 connected respectively to the gears 94 and 96.

Auxiliary gear sets 26 and 28 as combined constitute an auxiliary gear box for transmission 10. Gear 110 constituting a part of gear set 26 is keyed to intermediate shaft 32 and has meshing engagement with a gear 112 forming the other part of gear set 26 and gear 112 is in turn adapted to be coupled by way of a friction clutch 114 to a gear 116 keyed to output shaft 34. Gear 116, constituting a part of gear set 28 meshes with a gear 118 forming the other part of gear set 28, and gear 118 is in turn adapted to be coupled to gear 110 by way of a friction clutch 120. Clutches 114 and 120 are of the multiple plate type and include input plates 122 and 124 connected respectively to gears 110 and 112 and output plates 126 and 128 connected respectively to gears 118 and 116.

Friction clutches 60, 64, 78, 82, 104, 114 and 120 can be actuated by any of several conventional means, such as hydraulically, vacuum, or electricity.

For the purpose of achieving eight forward as well as eight reverse speeds the gears are required to be predetermined as to size such for example wherein meshing gears 54 and 76 are provided with 25 and 45 teeth respectively, meshing gears 56 and 80 are provided with 38 and 32 teeth respectively, meshing gears 46 and 58 are provided with 31 and 39 teeth respectively, meshing gears 48 and 62 are provided with 19 and 51 teeth respectively, meshing gears 110 and 112 are provided with 19 and 62 teeth respectively, meshing gears 118 and 116 are provided with 45 and 36 teeth respectively, reverse gear 96 is provided with 31 teeth and reverse gear 94 is provided with 39 teeth. The first forward speed of the transmission is obtained through an energization of clutch 12, engagement of clutch 64 and engagement of clutch 114 such that power flows by way of clutch 12, output member 38, shaft 42, gear cluster 44, meshing gears 48 and 62, engageable plates 66 and 72 of clutch 64, member 74, shaft 32, meshing gears 110 and 112, engageable plates 124 and 128 of clutch 114, gear 116 and output shaft 34. Second forward speed is next obtained by de-energizing clutch 12, simultaneously energizing clutch 14, disengaging clutch 64, simultaneously engaging clutch 78, and maintaining clutch 114 engaged whereby power flows from clutch 14, output member 40, shaft 50, gear cluster 52, meshing gears 54 and 76, clutch 78, shaft 32, meshing gears 110 and 112, clutch 114, gear 116 and shaft 34.

A third forward speed is achieved upon the de-energization of clutch 14, simultaneous energization of clutch 12, disengagement of clutch 78, simultaneous engagement of clutch 60 and maintenance of clutch 114 engaged whereby power flows by way of clutch 12, output member 38, shaft 42, gear cluster 44, meshing gears 46 and 58, clutch 60, shaft 32, meshing gears 110 and 112, clutch 114, gear 116 and shaft 34.

Fourth speed of operation of the transmission is obtained by de-energizing clutch 12, simultaneously energizing clutch 82, and maintaining clutch 114 engaged whereby power flows by way of clutch 114, output member 40, shaft 50, gear cluster 52, meshing gears 56 and 80, clutch 82, shaft 32 meshing gears 110 and 112, clutch 114, gear 116 and shaft 34.

It is to be noted that throughout the first four forward speeds of operation of the transmission that the gear ratio of the auxiliary gear box has remained constant and it is thus only necessary to disengage clutch 114 and simultaneously engage clutch 120 in the auxiliary gear box to obtain forward speeds five through eight of the transmision wherein the same sequence of operation of clutches 12 and 14, and clutches 64, 78, 60 and 82 is had in connection therewith as occurred for speeds one through four.

During all eight forward speeds of operation of the transmission the clutch 104 is disengaged and it is not until a reverse drive is desired is said clutch engaged. With clutch 104 engaged and by reason of idler gear 98 in meshing relation between gears 96 and 54 a reverse rotation is imparted, by way of the appropriate gear sets in power delivering operation, to intermediate shaft 32 which reverse rotation is in turn by way of the auxiliary gear box to output shaft 34.

The first reverse speed is obtained with clutch 104 engaged, clutch 14 energized, clutch 64 engaged, clutch 114 engaged and with clutch 12 de-energized and clutches 78, 60, 82, and 120 disengaged, such that power flows by way of clutch 14, output member 40, shaft 50, gear cluster 52, meshing gears 54 and 98, and 98 and 96, clutch 104, meshing gears 94 and 46, gear cluster 44, meshing gears 48 and 62, clutch 64, shaft 32, meshing gears 110 and 112, clutch 114, and gear 116 to shaft 34.

A second reverse speed is subsequently obtained through the de-energization of clutch 14 and simultaneous energization of clutch 12, disengagement of clutch 64 and simultaneous engagement of clutch 78, and the continued engagement of clutches 104 and 114. As such power flows by way of clutch 12, output member 38, shaft 42, gear cluster 44, meshing gears 46 and 94, clutch 104, meshing gears 96 and 98, 98 and 54, meshing gears 54 and 76, clutch 78, shaft 32, meshing gears 110 and 112, clutch 114, and gear 116 to shaft 34.

A reverse speed is obtained in advancing from second reverse speed by de-energizing clutch 12 and simultaneously energizing clutch 14, disengaging clutch 78 and simultaneously engaging clutch 60, while maintaining clutches 104 and 114 engaged for the delivery of power by way of clutch 14, output member 40, shaft 50, gear cluster 52, meshing gears 54 and 98, and 98 and 96, clutch 104, meshing gears 94 and 46, and 46 and 58, clutch 60, shaft 32, meshing gears 110 and 112, clutch 114, and gear 116 to shaft 34.

Fourth reverse speed is next obtained by de-energizing clutch 14 and simultaneously energizing clutch 12, disengaging clutch 60 and simultaneously engaging clutch 82, and with the clutches 104 and 114 maintained closed. Power delivery in fourth reverse speed is had by way of clutch 12, output member 38, shaft 42, gear cluster 44, meshing gears 46 and 94, clutch 104, meshing gears 96 and 98, and 98 and 54, gear cluster 52, meshing gears 56 and 80, clutch 82, shaft 32, meshing gears 110 and 112, clutch 114, and gear 116 to shaft 34.

Reverse speeds of five through eight are obtained through the employment of gear train 118 and 116 of the auxiliary gear set 26 instead of gear train 110 and 112 utilized in the case of reverse speeds one through four. In the case of reverse speeds five through eight the same gear trains are used in their respective order as for reverse speeds one through four aside from the gear trains of auxiliary gear set 26.

By alternately energizing the clutches 12 and 14 it is possible, through the provision of transmission 10 affording eight forward and reverse speeds, to effect an alternate backward and forward movement of the vehicle in which the transmission is incorporated. For example with any one of the clutches 60, 64, 78 or 82 closed and clutch 104 closed forward and reverse drive is accomplished. It will also be noted that the vehicle can be made to run forward if either clutch 60 or 64 is engaged at the same time that clutch 12 is energized and a reverse operation of the vehicle is had with either clutch 78 or 82 engaged at the same time that clutch 14 is energized and either clutch 60 or 64 maintained engaged. In view of the aforesaid rocking of the vehicle it is best accomplished by using clutch 64 for both forward and reverse or by using clutch 64 for forward and clutch 60 for reverse wherein with clutch 64 continuously engaged an alternate energization of the clutches 12 and 14 will effect the respective forward and reverse movement of the vehicle in which transmission 10 is incorporated. In using clutch 64 for forward and clutch 60 for reverse, clutch 12 is energized simultaneously with the engagement of clutch 64 and upon de-energization of clutch 12 and disengagement of clutch 64, clutch 14 is energized and clutch 60 is engaged. Similarly to the use of clutches 60 and 64, clutch 78 can be used for both forward and reverse or clutch 78 can be used for forward and clutch 82 for reverse. Inasmuch as it would require more complicated switching to use clutch 64 for forward and either clutch 78 or 82 for reverse, it is not practical to do so although actually possible.

In view of the arrangement of the clutches 12 and 14 in association with the gear trains driven therefrom it is possible to effect a braking action of the transmission through the simultaneous energization of both clutches 12 and 14, such that through the engagement of either of clutches 60 or 64 and clutches 78 or 82, a counter-reaction of the clutches is had by way of shaft 32 acting to retard the rotation thereof.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A transmission comprising a prime mover driven member, first and second selectively operable clutches driven from said driven member, first and second shafts connected respectively to the first and second clutches, a first and second set of axially spaced gears connected to the respective first and second shafts, a third shaft, a third set of axially spaced gears meshing respectively with the first set of axially spaced gears, a fourth set of axially spaced gears meshing respectively with the second set of axially spaced gears, clutch means coupling the third set of axially spaced gears to the third shaft, a second clutch means coupling the fourth set of axially spaced gears with the third shaft, and a jack shaft, a fifth set of axially spaced gears arranged in coaxial relation on the jack shaft with one of said gears meshing with one of the gears of the first set of axially spaced gears, an idler gear in meshing relation with the gear of the fifth set of axially spaced gears which is not in meshing engagement with a gear of the first set of axially spaced gears and with a gear of the second set of axially spaced gears, and a clutch coupling the gears of the fifth set of axially spaced gears together.

2. A transmission according to claim 1 wherein the second shaft is a quill shaft arranged in coaxial relationship to the first shaft.

3. A transmission according to claim 1 wherein the selectively operable clutches are of the slip torque type.

4. A transmission according to claim 1 wherein the first and second clutch means each include a part affixed to the third shaft.

5. A transmission according to claim 1 wherein a fourth shaft is provided, a sixth set of axially spaced gears, arranged in coaxial relation on the fourth shaft, with one of said gears affixed to the fourth shaft, a clutch coupling the gears of the sixth set of axially spaced gears together, a seventh set of axially spaced gears, arranged in coaxial relation on the third shaft, with one of said gears affixed to the third shaft meshing with the gear of the sixth set of axially spaced gears and with the other of said gears of the seventh set of axially spaced gears meshing with the gear of the sixth set of axially spaced gears affixed to the fourth shaft, and a clutch coupling the gears of the seventh set of axially spaced gears together.

6. A transmission according to claim 1 wherein the gears of the respective sets of axially spaced gears meshing with one another provide sets of meshing gears of different ratio to one another.

7. A transmission according to claim 1 wherein the gears of the third and fourth sets of axially spaced gears are each independently clutchable with the third shaft.

8. A transmission according to claim 2 wherein the third shaft is arranged in parallel array to the first and second shafts and the third and fourth sets of axially spaced gears are arranged in coaxial relation to the third shaft.

9. A transmission according to claim 3 wherein the slip torque clutches are of the eddy current electromagnetic type.

10. A transmission according to claim 6 wherein one set of meshing gears of the first and third sets of axially spaced gears provides for first gear ratio speed of the transmission, and the other set of meshing gears of the first and third sets of axially spaced gears provides for third gear ratio speed of the transmission, one set of meshing gears of the second and fourth sets of axially spaced gears provide for second gear ratio speed of the transmission, and the other set of meshing gears of the second and fourth sets of axially spaced gears provide for fourth gear ratio speed of the transmission.

11. A transmission comprising a prime mover driven member, first and second selectively operable clutches driven from said driven member, first and second co-axial shafts connected respectively to the first and second clutches, a first set of axially spaced gears, comprising different diameter gears, connected to the first shaft, a second set of axially spaced gears, comprising different diameter gears, connected to the second shaft, a third shaft arranged parallel to the first and second shafts, a third set of axially spaced gears, comprising different diameter gears, with the larger diameter gear thereof meshing with the smaller diameter gear of the first set of gears and with the smaller diameter gear thereof meshing with the larger diameter gear of the first set of gears, a fourth set of axially spaced gears, comprising different diameter gears, with the smaller diameter gear thereof meshing with the larger diameter gear of the second set of gears and with the larger diameter gear thereof meshing with the smaller diameter gear of the second set of gears, a first clutching means for coupling the third set of gears to the third shaft including a clutch element connected to the third shaft and clutch elements, connected to the respective gears of the third set of gears, for alternate engagement with the clutch element on the third shaft, a second clutching means for coupling the fourth set of gears to the third shaft including a second clutch element connected to the third shaft and clutch elements, connected to the respective gears of the fourth set of gears, for alternate enagement with the second clutch element connected to the third shaft, said meshing of the smaller gear of the first set of gears and the larger gear of the third set of gears, with the clutching element, connected to the larger gear of the third set of gears, engaged with the first clutch element connected to the third shaft, providing for first gear ratio operation of the transmission, said meshing of the larger gear of the first set of gears and the smaller gear of the second set of gears, with the clutching element connected to the smaller gear of the third set of gears, engaged with the first clutch element connected to the third shaft, providing for third gear ratio operation of the transmission, said meshing of the smaller gear of the second set of gears and the larger gear of fourth set of gears, with the clutching element connected to the larger gear of the fourth set of gears engaged with the second clutching element connected to the third shaft, providing for second gear operation of the transmission, and said meshing of the larger gear of the second set of gears and the smaller gear of the fourth set of gears, with the clutching element connected to the smaller gear of the fourth set of gears engaged with the second clutching element connected to the third shaft, providing for fourth gear operation of the transmission, a jack shaft, and gearing means supported for rotation thereon having meshing relation with one of the gears of the first set of axially spaced gears and driving relationship with one of the gears of the second set of axially spaced gears providing for reverse power transmission between said first and second shafts.

References Cited in the file of this patent

UNITED STATES PATENTS

| | | |
|---|---|---|
| 2,396,456 | Campodonico | Mar. 12, 1946 |
| 2,445,716 | Sternberg | July 20, 1948 |
| 2,582,220 | Beckwith | Jan. 15, 1952 |
| 2,601,297 | Keese | June 24, 1952 |